United States Patent [19]

Harlfinger et al.

[11] 4,204,924
[45] May 27, 1980

[54] METHOD OF MANUFACTURING RUBBING SURFACES OF CAST IRON

[75] Inventors: Rudolf Harlfinger; Theobald Ehehalt; Alfred Kappes, all of Neckarsulm, Fed. Rep. of Germany

[73] Assignee: Audi NSU Auto Union Aktiengesellschaft, Neckarsulm, Fed. Rep. of Germany

[21] Appl. No.: 696,384

[22] Filed: Jun. 15, 1976

[30] Foreign Application Priority Data

Jul. 11, 1975 [DE] Fed. Rep. of Germany ....... 2531013

[51] Int. Cl.$^2$ ............................................... C25F 3/06
[52] U.S. Cl. ........................... 204/129.35; 204/129.75
[58] Field of Search ................ 204/129.1, 129.35, 16, 204/129.75

[56] References Cited

U.S. PATENT DOCUMENTS

| 240,107 | 4/1881 | Eaton ............................. 204/129.1 X |
| 3,932,228 | 1/1976 | Sugiyama et al. ................. 204/16 X |
| 3,945,893 | 3/1976 | Ishimori et al. ............... 204/129.1 X |

FOREIGN PATENT DOCUMENTS 1273987  9/1961  France .................................. 204/129.1

Primary Examiner—John H. Mack
Assistant Examiner—D. R. Valentine

[57] ABSTRACT

A method is provided for manufacturing rubbing surfaces of cast iron comprising a perlitic or ferritic basic structure or matrix and free graphite.

2 Claims, No Drawings

METHOD OF MANUFACTURING RUBBING SURFACES OF CAST IRON

BACKGROUND OF THE INVENTION

Machine components made of cast iron with rubbing surfaces on which sealing elements slide are in wide use in technology as cast iron is a cheap material which exhibits low wear when used in conjunction with suitable co-operating materials. The low wear is attributable to the free graphite contained in the iron, which graphite acts as a lubricant for the rubbing surface. For example on this basis the internal surfaces of cylinders, against which piston rings or other sealing elements slide, are often made of such cast irons. In machines having cylinders with such cast iron surfaces, in particular internal combustion engines, a certain running-in period is generally prescribed in order to avoid "seizing", i.e. local welding of the sealing elements to the rubbing surfaces. The running-in process has been looked upon as a smoothing or polishing process by which the high points or roughnesses produced in manufacture of the rubbing surfaces are smoothed off. In order to be able to shorten or completely eliminate the running-in period it is known to harden such rubbing surfaces, for example inductively, but this brings with it certain drawbacks, amongst others the danger of cracking and distortion. Moreover it means that one has to employ particular kinds of cast iron which are capable of being hardened. Finally it causes an increase in the wear of the sealing elements that run against the surface in question.

SUMMARY OF THE INVENTION

The invention is based on solving the problem of providing a process by which rubbing surfaces can be produced from cast iron which on the one hand require no running-in period, and, on the other hand, are not so hard that they result in excessive wear of the sealing elements that engage them.

The process according to the invention is characterized in that the rubbing surface is worked to a finished size by machining, then degreased and subsequently subjected to an electro-chemical etching process by which the basic structure smeared over the particles of graphite during the machining process is etched away.

The invention is based on the realization that the tendency to seizing which is observed in unhardened cast iron rubbing surfaces when first used is caused less by the presence of high points produced in the manufacture of the surface than by the fact that during the machining of the surface by grinding, honing or super-finishing, the matrix structure or main phase becomes smeared over the graphite particles and these are therefore no longer exposed and they cannot perform their lubricating function. Only when this superimposed main phase is removed after a greater or lesser running-in period can the graphite particles exert their lubricating action. The process according to the invention virtually takes the place of this running-in process so that right from the start a finished running surface, able to take the full load, is present.

From German Patent Specification No. 1 069 980 it is known to improve the sliding characteristics of cast iron components nitrided in a salt bath, especially piston rings, by removing the uppermost layer of the nitrided parts by anodic treatment in an acid medium. This uppermost layer comprises hard small tightly adhering grains and accordingly has very bad running characteristics. Therefore in this case the starting point is a running surface which has been hardened by nitriding, in which the roughnesses or high points caused by the nitriding process itself are eliminated by an etching process. This prior publication gives no lead towards the proposal according to the invention, which is achieved with a running surface which is expressly a non-hardened one.

The process according to the invention is extremely cheap and can be performed in a short period of time. A suitable electrolyte has been found to be a weak solution, about 2%, of common salt and in this the etching process can be carried out in less than a minute with a current density of about 10 to 20 amps per square decimeter.

EXAMPLE

A workpiece of perlitic cast iron (GG 25) with 0.3 to 0.5% Cr and about 3% C, present as free graphite, which has a running or rubbing surface machined by a chip removing process, such as grinding, polishing or super-finishing, to a final dimension with a minimum surface roughness of 2 to 3 micrometers, is degreased and mounted on a plate-like electrode forming an anode, so that the rubbing surface is free. At a spacing of about 12 mm from the rubbing surface a copper plate electrode is mounted to form a cathode. The assembly is mounted in a synthetic resin vessel filled with an electrolyte comprising a 2% solution of common salt. Then a voltage of 5 volts is applied between the electrodes, resulting in a current density of 12 amps per square decimeter. After treatment time of about 45 seconds the current is switched off, the cast body removed from the electrolyte and rinsed and the rubbing surface is oiled to prevent oxidation. The etching process can be carried out at room temperature. The electrolyte can be maintained in motion to simplify the escape of the hydrogen that is produced.

By means of the etching process the base structure or matrix which had been smeared over the graphite particles by the preceding mechanical working process to a thickness of about 1 to 5 micrometers is etched away so as to result in a rubbing surface which can immediately be put under full load without any running-in step.

What is claimed:

1. Method of manufacturing rubbing surfaces of cast iron comprising providing a perlitic or ferritic basic structure or matrix and free graphite particles wherein the rubbing surface is machined to its final dimensions and as a result of this machining particles of the basic structure or matrix are smeared over the graphite, the rubbing surface is then degreased, and thereafter the rubbing surface is subjected to an electro-chemical etching process by placing the rubbing surface in an electrolyte in which electrodes have applied between them a predetermined voltage by which the basic structure or matrix which has been smeared over the graphite particles by the machining step is etched away to expose the graphite particles so that the rubbing surface can immediately be put under full load without any running-in period.

2. Method according to claim 1 wherein the electro-chemical etching process is performed using a weak solution of common salt with a current density of about 10 to 20 amps per square decimeter over a period of less than a minute.

* * * * *